United States Patent [19]

Masuda

[11] Patent Number: 4,933,222
[45] Date of Patent: Jun. 12, 1990

[54] PROCESS FOR PRODUCING INFORMATION RECORDING MEDIUM

[75] Inventor: Toshiyuki Masuda, Fujinomiya, Japan

[73] Assignee: Fuji Photo Film Co., Ltd., Minami-ashigara, Japan

[21] Appl. No.: 177,239

[22] Filed: Apr. 4, 1988

[30] Foreign Application Priority Data

Apr. 2, 1987 [JP] Japan ............................ 62-81778

[51] Int. Cl.$^5$ ............................................. B32B 3/02
[52] U.S. Cl. ................................ 428/64; 428/65; 428/908; 428/913; 346/76 L; 346/135.1; 346/137; 369/284; 430/945
[58] Field of Search ............... 428/64, 65, 913, 908; 346/76 L, 135.1, 137; 369/284; 430/945

[56] References Cited

U.S. PATENT DOCUMENTS

| 4,353,767 | 10/1982 | Wilkinson | 346/135.1 |
| 4,539,673 | 9/1985 | Winslow | 369/284 |
| 4,564,932 | 1/1986 | Lange | 369/284 |
| 4,590,493 | 5/1986 | Inoue et al. | 369/284 |
| 4,644,520 | 2/1987 | Lange | 369/284 |
| 4,758,063 | 7/1988 | Konechny, Jr. | 361/401 |

FOREIGN PATENT DOCUMENTS 58-14342 1/1983 Japan .
60-103537 6/1985 Japan .

Primary Examiner—Patrick Ryan
Attorney, Agent, or Firm—Sixbey, Friedman, Leedom & Ferguson

[57] ABSTRACT

A process for producing an information recording medium such as an optical disc comprises the steps: putting a disc-shaped flexible resin film having a hole at its central part upon a surface of the recording layer-side of a disc-shaped resin substrate; placing them on a ultrasonic welding machine between its applying horn and its receiving tool in such a manner that the resin film and the applying horn are opposed to each other, wherein the horn has a ring-shaped protrusion provided with a raised portion; and applying ultrasonic wave to them while pressing the resin film to weld the resin film to the substrate.

9 Claims, 4 Drawing Sheets

PROCESS FOR PRODUCING INFORMATION RECORDING MEDIUM

BACKGROUND OF THE INVENTION

1. Field of the Invention

The present invention relates to a process for producing an information recording medium. More particularly, it relates to a process for producing an information recording medium comprising joining a disc-shaped resin film to a disc-shaped resin substrate.

2. Description of Prior Art

Information recording medium using high energy density beam such as laser beam has been developed and put to practical use in recent years. The information recording medium is called optical disc and can be used as video disc, audio disc and disc memory for large-capacity static image files and large-capacity computers.

The optical disc basically comprises a recording layer provided on a disc-shaped transparent substrate of a plastic material or glass. An undercoat lay or intermediate layer of a high-molecular material can be provided on the surface (on which the recording layer is provided) of the substrate from the viewpoints of improving the smoothness of the surface, adhesion between the substrate and the recordingw layer and the sensitivity of the optical disc.

The recording layer is susceptible to external influences so that it must be protected from the external influences. Thus, there are generally used optical discs having an air sandwich structure where a substrate having a recording layer thereon is joined to another substrate which may have a recording layer via inner and outer spacers in such a state that the recording layer is positioned inwards.

However, the optical disc having an air sandwich structure has disadvantages in that the manufacturing process thereof is complicated and as a result, the manufacturing cost thereof is high and in that the thickness of the disc is large and hence it may be hard to handle.

In order to solve the above-described problems, there had been proposed a method in which a disc-shaped resin film is joined to a surface of the substrate, on said surface side of substrate being provided the recording layer (see, Japanese Patent Provisional Publication No. 51(1976)-75523). In this method, the film is joined to the disc substrate by means of an adhesive in the course of assembly of the optical disc. However, when the bonding of each member is carried out by means of an adhesive, it takes from tens of seconds to several minutes to coat and cure the adhesive per disc, so that there is much difficulty in mass-producing the disc. Further, there is possibility that the adhesive is squeezed out on the outer and inner peripheries of the substrate or on the side, on which the recording layer is provided, when the film is joined to the substrate. When the adhesive is squeezed out on the recording layer side of the substrate, the adhesive sticks to the recording layer and as a result, the recording layer deteriorate. Further, there is a problem that the sheet-form film is peeled off from the substrate by environmental change or with the passage of time, when they are joined to each other by means of an adhesive.

Japanese Patent Provisional Publication No. 16(1986)-104375 proposes a joining method wherein the sheet-form film is joined to the substrate by means of sewing, baking, adhesive tape, pinning and nailing in addition to the use of the adhesive.

However, this method causes the following problems. For example, the baking has a problem with regard to the accuracy of the substrate, since heat or load is applied to the disc substrate and optical properties are adversely affected. Further, there is possibility that recording characteristics of the recording layer near the joined part are deteriorated by heat. The joining by pinning or nailing has problems in that the manufacturing process is complicated and there is possibility that the film is broken during handling at a position where the film is fixed, since the film is thin. The joining by sewing or adhesive tap has also disadvantages in that the manufacturing process is complicated, thread or tape is aged with the passage of time and the joined deteriorates or the appearance is spoiled.

With regard to the joining of the substrates to each other, there had been proposed a method wherein ultrasonic wave is applied (see, Japanese Patent Provisional Publication No. 58(1983)-14342). In this method, ultrasonic wave is used to join the substrates to each other. However, since ultrasonic wave is applied to both surfaces of the substrates, large energy is required for satisfactorily welding them. Thus, there is a problem that the substrates are badly affected and this method is practically not advantageous.

SUMMARY OF THE INVENTION

It is an object of the present invention to provide a process for producing an information recording medium which enables joining of the film to the substrate to be firmly kept over a long period of time to thereby cause hardly deterioration of recording characteristics.

The invention provides a process for producing an information recording medium, which comprises the steps:

putting a disc-shaped flexible resin film having a hole at its central part upon the surface of a recording layer-side of a disc-shaped resin substrate having such a structure that a hole is provided at its central part, an inner-side non-recording zone is provided outside the periphery of the hole, an outer-side non-recording zone is provided inside the outer periphery of the substratee and a recording layer is provided between said inner-side and outer-side non-recording zones on the substrate;

placing them between an applying horn and a receiving tool of an ultrasonsic welding machine in such a manner that the resin film and the applying horn are opposed to each other, said applying horn of the welding machine having a ring-shaped protrusion for applying ultrasonic wave, and said protrusion being provided with raised portions in a ring form on the surface thereof; and applying ultrasonic wave to them while pressing the resin film to weld the resin film to the substrate.

Further, the present invention provides a process for producing an information recording medium, which comprises the steps:

putting the above-mentioned disc-shaped resin film upon the above-mentioned disc-shaped resin substrate;

placing them between an applying horn of the ultrasonic welding machine and the receiving tool thereof in such manner that the resin film and the receiving tool are opposed to each other, said applying horn having a ring-shaped protrusion for applying ultrasonic wave and the receiving tool having raised portions at the corresponding positions to the ring-shaped protrusion; and Applying ultrasonic wave to them while pressing the resin film to weld the resin film to the substrate.

DETAILED DESCRIPTION OF THE INVENTION

The present invention will be described in more detail by referring to the accompanying drawings.

Figure 1:
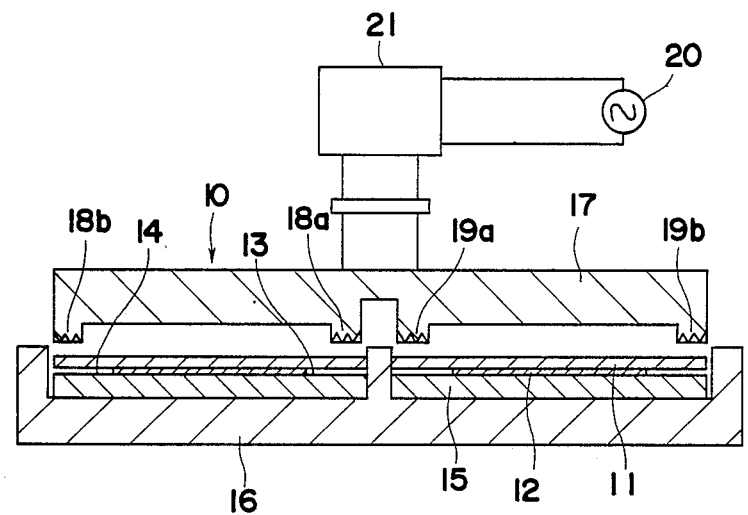
FIG. 1 is a sectional view showing a manufacturing process of an information recording medium according to the present invention.
Figure 2:
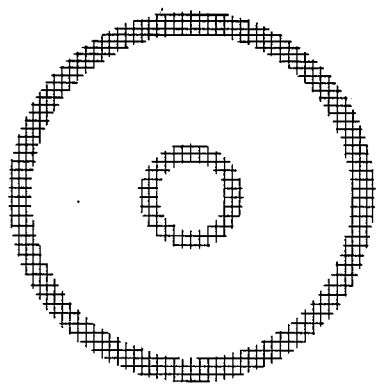
FIGS. 2 and 3 are a plane view showing ring-form raised portions provided on the ring-shaped protrusions of an applying horn.

FIGS. 1 and 2 are given to illustrate an embodiment of a manufacturing process of an information recording medium according to the invention.

Referring to FIG. 1, a disc-shaped flexible resin film 11 having a hole at its central part is put upon a surface of a disc-shaped resin substrate 15 (on which a recording layer 12 is formed) having such a structure that a hole is provided at its central part, an inner-side non-recording zone 13 is set around (outside) the pheriphery of said hole, an outer-side non-recording zone 14 is set inside the outer periphery of the substrate and a recording layer 12 is provided between said inner-side non-recording zone 13 and said outer-side non-recording zone 14. The resin film 11 and the resin substrate 15 as such are placed between a receiving tool 16 of an ultrasonic welding machine 10 and the applying horn 17 thereof in such a manner that the resin film 11 and the horn 17 are opposed to each other.

The ultrasonic welding machine 10 comprises the receiving tool 16 and the ultrasonic wave applying horn 17 which is provided with ring-shaped protrusions 18a, 18b which are further provided with ring-form raised portions on the surfaces thereof. Ultrasonic wave is generated from an ultrasonic generator 20, transmitted through a converter 21 and then applied to the horn 17. The horn 17 is descended to press the resin film 11 by the raised portions 19a, 19b on the surfaces of the ring-shaped protrusions 18a, 18b of the horn 17. While keeping this state, ultrasonic wave is applied thereto to weld the resin film 11 to the substrate 15.

The resin film is thin and flexible. Accordingly, when the film is pressed, the parts of the film in contact with the raised portions are deformed into shapes corresponding to the raised portions and the film in the deformed state is pressed against the substrate. The deformed resin film functions as an energy director (part where applied ultrasonic wave is concentrated and which is easily molten by the concentrated energy), so that welding is easily performed.

In the present invention, the joining of these members is carried out in a short time by ultrasonic welding as described above, so that deterioration in the recording characteristics of the recording layer due to heat generated during welding is hardly caused.

Figure 3:
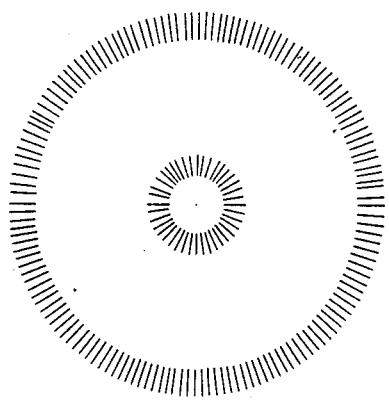

FIG. 2 and FIG. 3 show schematically a bottom view of the ring-form raised portions provided on the ring-shaped protrusion of the horn. In FIG. 2, the ring-form raised portions are in a lattice form. In FIG. 3, the ring-form raised portions are in a radial form wherein a plurality of lines radiate from the center of the ring of the outer pheriphery.

Figure 4:
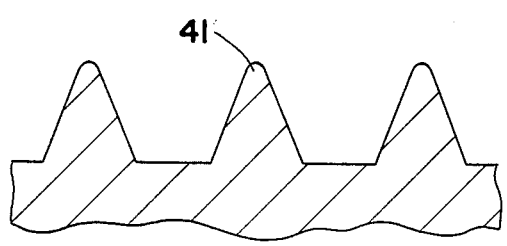
FIG. 4 is a partial sectional view showing the shapes of raised portions to be provided on the ring-shaped protrusion of the horn or on the receiving tool.

FIG. 4 shows a partial cross section of a plane perpendicular to the radial line of the raised portion in the radial form of FIG. 3. The cross section of the raised portion is in a wedge form. It is preferred that the tip thereof is roundish.

Figure 5:
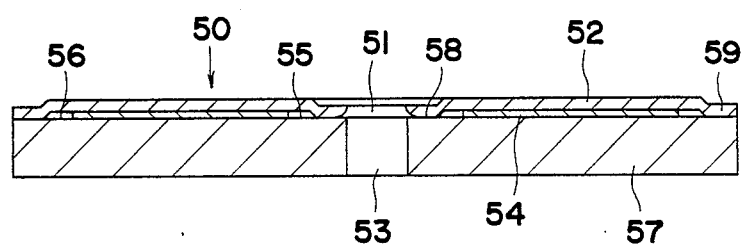
FIG. 5 is a sectional view of an information recording medium produced according to the process of the present invention.

FIG. 5 shows a sectional view of an information recording medium produced according to the manufacturing process of FIG. 1. Namely, a disc-shaped flexible resin film 52 having a hole 51 at its central part is put upon the surface of the recording layer-side of disc-shaped resin substrate 57 wherein a recording layer 54 is provided between an inner-side non-recording zone 55 and an outer-side non-recording zone 56, and the film is joined to the substrate at welded parts 58, 59.

Figure 6:
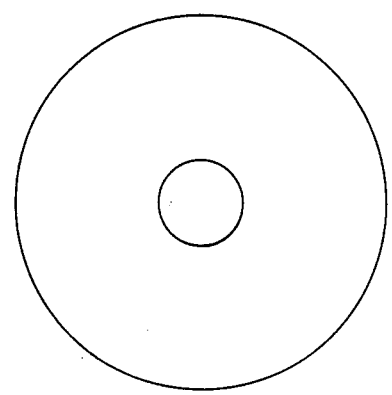
FIGS. 6 and 7 are a plane view showing other embodiments of the ring-form raised portion.
Figure 7:
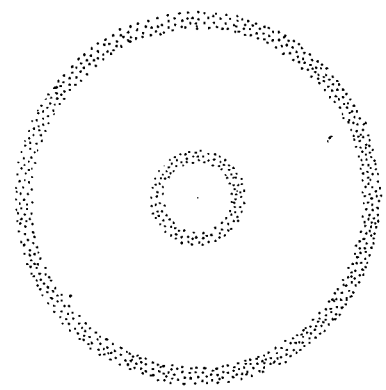

FIG. 6 and FIG. 7 are a plane view showing other embodiments of ring-form raised portions. In FIG. 6, the tips of the ring-form raised portions are in a continuous form. In FIG. 7, the ring-form raised portions are composed of a great number of small raised portions in the form of a drill. The tips of the small raised portions are in the form of a plurality of dots.

Figure 8:
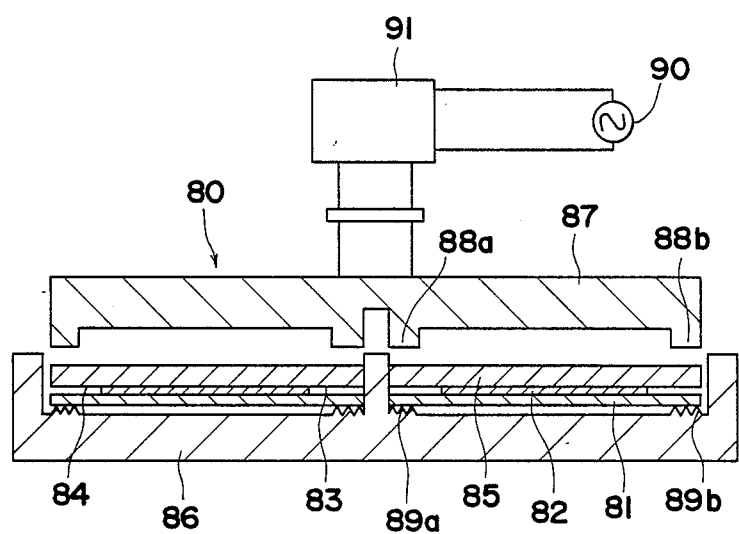
FIG. 8 is a sectional view showing another manufacturing process of an information recording medium according to the present invention.

FIG. 8 shows schematically another manufacturing process of an information recording medium according to the invention..In FIG. 8, a disc-shaped flexible resin film 81 provided with a hole at its central part is put upon the surface of the recording layer-side of a disc-shaped resin substrate 85 having such a structure that a hole is provided at its central part, an inner-side non-recording zone 83 is provided around the periphery of the hole, an outer-side non-recording zone 84 is provided inside the outer periphery of the substrate and a recording layer 82 is provided between the inner-side non-recording zone and the outer-side non-recording zone. The resin film 81 and the resin substrate 85 as such are placed between the receiving tool 86 of an ultrasonic welding machine 80 and the applying horn 87 thereof in such a manner that the resin film 81 and the receiving tool 86 are opposed to each other.

The ultrasonic welding machine comprises the receiving tool 86 and the applying horn 87 provided with ring-shaped protrusions 88a and 88b for applying ultrasonic wave. The receiving tool 86 is provided with ring-form raised portions 89a, 89b at positions corresponding to the protrusions 88a, 88b. Ultrasonic wave is generated from an ultrasonic generator 90, transmitted through a converted 91 and then applied to the horn 87. The horn 87 is descended to press the resin substrate 85. As a result, the resin film 81 is pressed against the receiving tool 86, whereby the resin film is welded to the substrate 85 by the application of ultrasonic wave.

As described above with regard to the embodiment of FIG. 1, the resin film is thin and flexible. Thus, when the film is pressed, the parts of the resin film in contact with the raised portions are deformed into shapes corresponding to the raised portions. The deformed resin film functions as energy director, whereby the joining by welding can be easily achieved.

The ring-form shaped portions to be provided on the receiving tool may be in any form of those as shown in FIGS. 2, 3, 6 and 7. The information recording medium obtained by the manufacturing process of FIG. 8 may be in the form of that obtained by the manufacturing process of FIG. 5.

While preferred embodiments for producing the information recording medium according to the invention have been described above, the present invention is by no means limited thereto and modifications can be made in the embodiments described without departing from the scope of the invention. For example, the tips of the ring-form raised portions may be in any form, so long as the deformation of the resin film can follow the shapes of the tips thereof.

The welded parts of the resin film to the resin substrate form non-recording zones. Before welding, a recording material may be provided all over the surface of the substrate ranging from the periphery of the hole to the outer periphery of the substrate and hence the recording material may be present in the non-recording zones.

Substrates, recording layers and films which are conventionally used, can be used in the production of the information recording medium of the present invention. These matters will be briefly described below.

Materials for the substrates, which are used in the invention can be chosen from materials which are conventionally used as substrates for information recording mediums. Acrylic resins such as cell cast polymethyl methacrylate, injection-molded polymethyl methacrylate and polymethyl acrylate; vinyl chloride resins such as polyvinly chloride and vinyl chloride copolymers; epoxy resins; amorphous polyolefins; and other synthetic resins such as polycarbonate are preferred as substrate materials from the viewpoints of optical characteristics, surface smoothness, processability, handling properties, long-term stability and manufacturing cost. Polymethyl methacrylate, polycarbonates and epoxy resins are preferred from the viewpoints of dimensional stability, transparency and surface smoothness.

On the surface side of the substrate, on which the recording layer is provided, there may be provided an undercoat layer (and/or an intermediate layer) to improve surface smoothness and adhesion, and to prevent the recording layer from being deteriorated.

Examples of materials for the preparation of the undercoat layer and/or the intermediate layer include polymer materials such as polymethyl methacrylate, acrylate acid-methacrylic acid copolymer, nitrocellulose, polyethylene, polyproplene and polycarbonate; organic materials such as silane coupling agent; and inorganic materials such as inorganic oxides (e.g., $SiO_2$, $Al_2O_3$, ect.) and inorganic fluorides (e.g., $MgF_2$, etc.).

Examples of materials which can be used in the recording layer include metals such as Te, Zn, In, Sn, Zr, Al, Ti, Cu, Ge, Au and Pt; semimetals such as Bi, As and Sb; semiconductors such as Si; alloys of these elements; and mixtures thereof. Further, the compounds of these metals, semimetals and semiconductors such as sulfides, oxides, borides, silicates, carbides and nitrides and mixtures of these compounds and said metals can be used as the materials for the recording layers. Dyes, combinations of a dye and a polymer, combinations of a dye and the above metal and combinations of a dye and the above semimetal can also be used in the recording layer.

Further, the conventional metals, semimetals or compounds may be contained in the recording layer.

The recording layer can be formed on the substrate directly or through an udercoat layer by means of metallizing, sputtering, ion plating or coating. The recording layer may be composed of a single layer or two or more layers. The thickness of the layer is generally in the range of 100 to 5,500 A, preferably 150 to 1,000 A from the viewpoint of optical density required for optical information recording.

On the surface of the substrate (said surface being not provided thereon with the recording layer), there may be provided a thin film of an inorganic material (e.g., silicon dioxide, tin oxide or magnesium fluoride) or a polymer material (e.g., a thermoplastic resin or a photocurable resin) by means of vacuum metallizing, sputtering or coating to enchance abrasion resistance and moisture proofness.

Examples of materials for the disc-shaped resin film include thermoplastic resins such as acrylic resins, vinly chloride, resins, polystyrene resins, polyamide resin, polyolefin resins (e.g., polypropylene, polyethylene, etc.), polycarbonates, polyester resins and polyvinyl chloride resins. The materials are by no means limited thereto and any of materials can be used, so long as they can be well welded to the substrate by the ultrasonic welding method.

It is desirable that the same material as that for the substrate is used as the film material in the present invention. The thickness of the resin film is generally in the range of 10 to 500 um, preferably 50 to 100 um.

In the process for the production of an information recording medium according to the present invention, the joining of the resin film to the substrate is made by ultrasonic welding. Thus, the information recording medium can endure the peeling of the resin film from the substrate due to change in environmental conditions with the passage of time and the good joining can be kept over a long period of time. Accordingly, the recording layer can be protected by the resin film and recording characteristics are maintained stably over a long period of time. In the process for the production of the information recording medium by such ultrasonic welding, the manufacturing process is simple and mass production is possible.

Further, in the process for the production of the information recording medium according to the invention, the information recording medium can be producted without causing deterioration in the recording layer in the course of the production or without having an adverse influence upon the optical property of the substrate, unlike conventional processes for the production of the information recording medium by means of adhesives or thermal bonding.

I claim:

1. An information recording medium comprising a disc-shaped flexible resin film having a hole at its central part which is fixed on a surface of a recording layer-side of a disc-shaped resin substrate having such a structure that a hole is provided at its central part, an inner-side non-recording zone is provided around the periphery of the hole, an outer-side non-recording zone is provided inside the outer periphery of the substrate and a recording layer is provided between said inner-side and outside non-recording zones on the substrate; said fixation being accomplished by placing a disc-shaped flexible resin film having no energy director and the substrate between an applying horn of an ultrasonic welding machine having a ring-shaped protrusion for applying ultrasonic wave and a receiving tool thereof, said protrusion of the horn having a raised portion in a ring form on its surface or said receiving tool having a raised portion at the corresponding position to the ring-shaped protrusion of the applying horn, under the condition that the resin film and the raised portion of the applying horn or the receiving tool are opposed to each other, passing the applying horn onto the flexible film so that energy director is formed on the flexible film in a position corresponding to the raised portion on the applying horn or the receiving tool, and applying ultrasonic wave to them while pressing the resin film to weld the resin to the substrate utilizing the thus formed energy director.

2. The information recording medium as claimed in claim 1, wherein said ring-form raised portion is in a lattice form.

3. The information recording medium as claimed in claim 1, wherein said ring-form raised portion is in a radial form wherein a plurality of radial lines radiate from the center of the ring toward the outer periphery and the cross section of the raised portion perpendicular to the radial line is a wedge form.

4. A process for producing an information recording medium, which comprises the steps of:

putting a disc-shaped flexible resin film having a hole at its central part and having no energy director upon a surface of a recording layer-side of a disc-shaped resin substrate having such a structure that a hole is provided at its central part, an inner-side non-recording zone is provided around the periphery of the hole, an outer-side non-recording zone is provided inside the outer periphery of the substrate and a recording layer is provided between said inner-side and outer-side non-recording zones on the substrates;

placing them between an applying horn of an ultrasonic welding machine and a receiving tool thereof in such a manner that the resin film and the receiving tool are opposed to each other, said applying horn being provided with a ring-shaped protrusion for applying ultrasonic wave and said receiving tool having a raised portion at the corresponding position to the ring-shaped protrusion of the applying horn;

pressing the applying horn onto the flexible film, so that energy director is formed on the flexible film in a position corresponding to the raised portion on the protrusion of the applying horn; and applying ultrasonic wave to then while pressing the resin film to weld the resin film to the substrate utilizing the thus formed energy director.

5. The process for producing an information recording medium as claimed in claim 4, wherein said ring-form raised portions are in a lattice form.

6. The process for producing an information recording medium as claimed in claim 4, wherein said ring-form raised portion are in a radial form wherein a plurality of radial lines radiate from the center of the ring toward the outer periphery and the cross section of the raised portion perpendicular to the radial line is a wedge form.

7. A process for producing an information recording medium, which comprises the steps of:

putting a disc-shaped flexible resin film having a hole at its central part and having no energy director upon a surface of a recording layer-side of a disc-shaped resin substrate having such a structure that a hole is provided at its central part, an inner-side non-recording zone is provided around the periphery of the hole, an outer-side non-recording zone is provided inside the outer periphery of the substrate and a recording layer is provided between said inner-side and outer-side non-recording zones on the substrate;

placing then between an applying horn of an ultrasonic welding machine and a receiving tool thereof in such a manner that the resin film and the applying horn are opposed to each other, said applying horn having a ring-shaped protrusion for applying ultrasonic wave and said protrusion being provided with a raised portion in a ring form on the surface thereof;

pressing the applying horn onto the flexible film so that energy director is formed on the flexible film in a position corresponding to the raised portion on the receiving tool; and applying ultrasonic wave to them while pressing the resin film to weld the resin film to the substrate utilizing the thus formed energy director.

8. The process for producing an information recording medium as claimed in claim 7, wherein said ring-form raised portion is in a lattice form.

9. The process for producing an information recording medium as claimed in claim 7, wherein said ring-form raised portion is in a radial form wherein a plurality of radial lines radiate from the center of the ring to the outer periphery, and the cross section of the raised portion perpendicular to the radial line is a wedge form.

* * * * *